C. F. F. ALLAN.
PNEUMATIC TIRE PROTECTOR.
APPLICATION FILED OCT. 12, 1918.
1,324,369.
Patented Dec. 9, 1919.
2 SHEETS—SHEET 2.
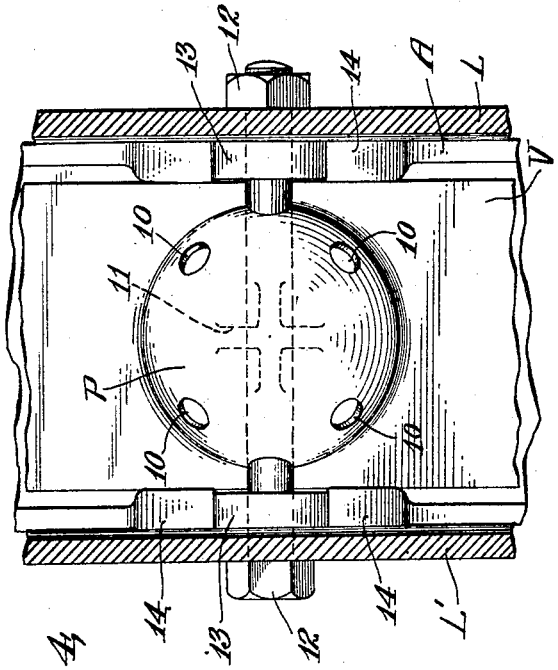
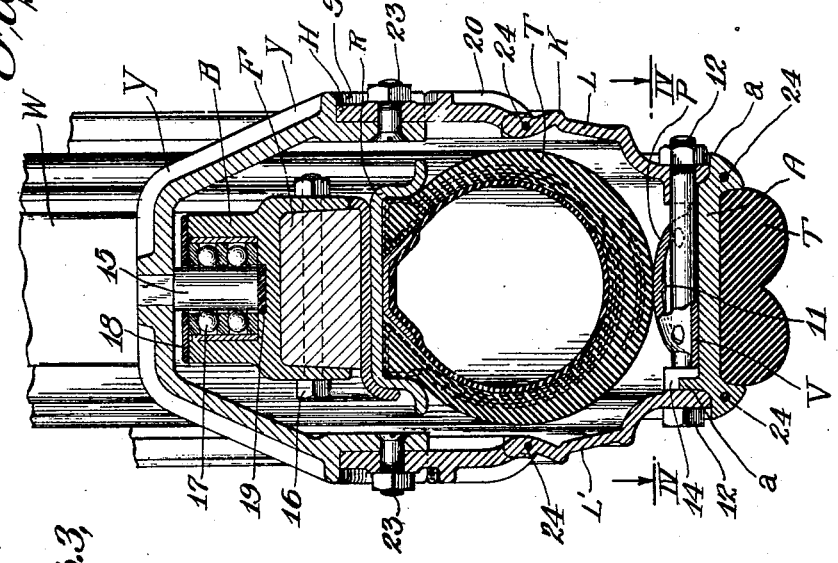
Inventor
Charles Frederick Fox Allan
By his Attorney
Wm. Wallace White

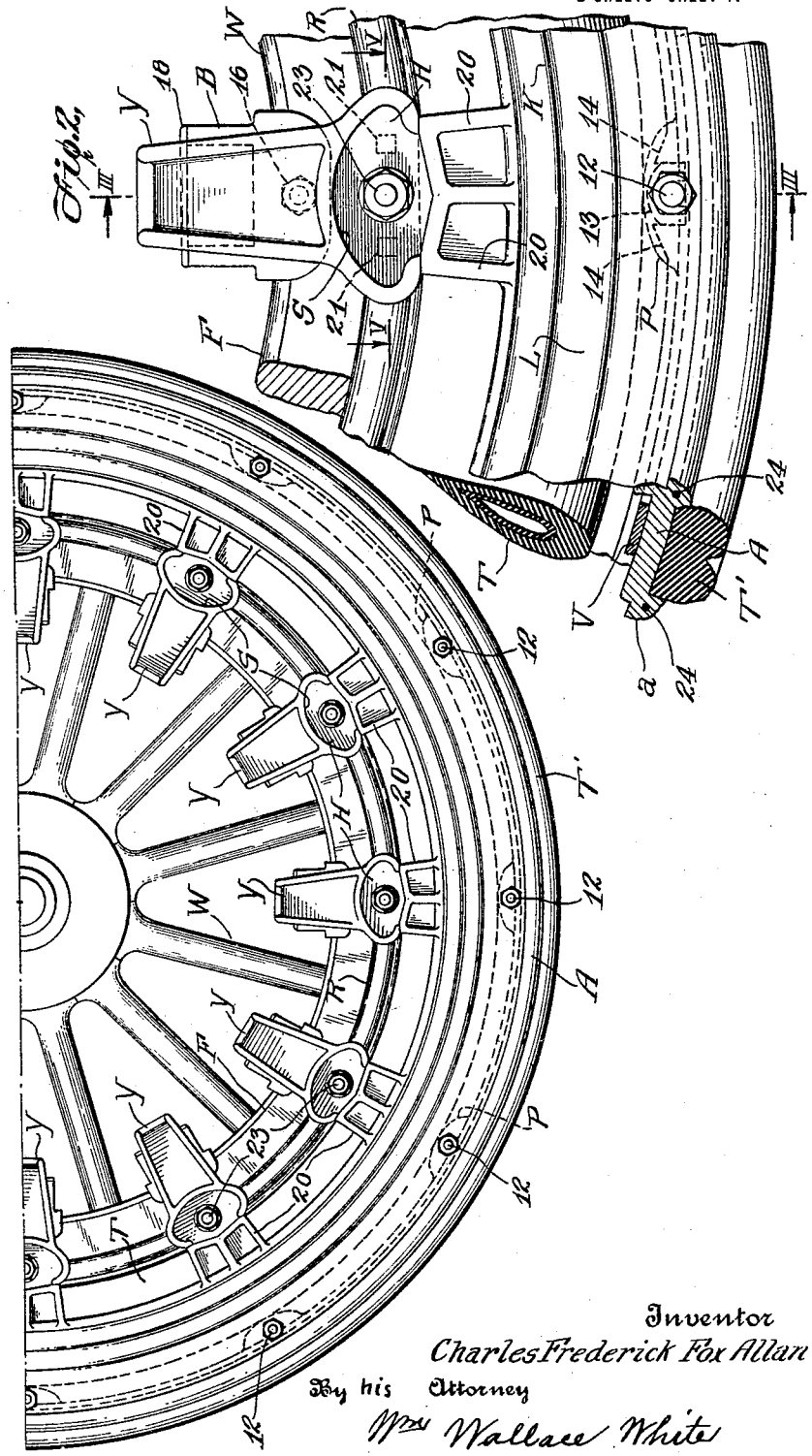

UNITED STATES PATENT OFFICE.

CHARLES FREDERICK FOX ALLAN, OF SYDNEY, AUSTRALIA.

PNEUMATIC-TIRE PROTECTOR.

1,324,369.   Specification of Letters Patent.   Patented Dec. 9, 1919.

Application filed October 12, 1918. Serial No. 257,839.

*To all whom it may concern:*

Be it known that I, CHARLES FREDERICK FOX ALLAN, a subject of the King of Great Britain and Ireland, residing at Sydney, Australia, have invented new and useful Improvements in Pneumatic-Tire Protectors, of which the following is a specification.

My invention relates to a protecting armor for pneumatic tires, and more particularly to the attaching means therefor, and has for its object to improve and simplify the construction and operation of a device of the character shown and described in my co-pending application, Serial No. 239,352, filed June the 11th, 1918.

I will describe one form of device embodying my invention, and will then point out the novel features thereof in claims.

Figure 1 is a view showing in side elevation an automobile wheel having applied thereto one form of device embodying my invention.

Fig. 2 is an enlarged fragmentary view showing in side elevation a portion of the device shown in Fig. 1.

Fig. 3 is a view taken on the line III—III of Fig. 2.

Fig. 4 is a horizontal sectional view taken on the line IV—IV of Fig. 3 and looking in the direction of the arrows.

Fig. 5 is a sectional view taken on the line V—V of Fig. 2.

Referring to the drawings in detail, W designates generally an automobile wheel of the ordinary construction and which, as illustrated to advantage in Fig. 3, comprises the felly F to which a pneumatic tire T is attached by means of a demountable rim R.

Surrounding the pneumatic tire T and spaced therefrom is an auxiliary rim A in which is secured an auxiliary tire T preferably formed of solid rubber. Interposed between the pneumatic tire T and the auxiliary rim A are dome-shaped projections or tread members P, the summits of which are adapted to bear upon the tread surface of the pneumatic tire, as shown in Fig. 3. These members P are disposed at regular spaced intervals preferably of 30 degrees throughout the circumference of the rim, and each member is formed with a plurality of openings 10 to permit the radiation of heat and circulation of air beneath the members so as to maintain the material of which they are formed at the lowest possible temperature. In the present instance I have shown the members P formed on a ring V which is seated within the auxiliary rim A as shown in Figs. 3 and 4. However, it is to be understood that they may be made integral with the rim A without departing from the spirit of the invention. Upon the inner surface of each member P crossed ribs 11 are formed to reinforce the member at the point at which it contacts with the tread surface of the pneumatic tire. The auxiliary rim A is secured in operative relation to the pneumatic tire by means of an attaching frame indicated generally at K. The attaching frame K comprises a pair of annuli L and L' disposed upon opposite sides of the pneumatic tire T and substantially Z-shaped in cross section to provide sufficient space to allow for the lateral expansion of the tire. The rim A is formed at its opposite edges with flanges $a$ which coact with each other to provide annular channels for the reception of the annuli L and L'. With the frame in position, the outer edges of each annulus L and L' are secured within the channels of the auxiliary rim A by means of transversely extending securing members 12 to prevent circumferential movement of the rim A upon the annuli. As an additional reinforcing means for the rim A and the annuli L and L', I embed wires 24 at the points shown in Fig. 3, which extend entirely around such members, as will be understood. The annuli L and L' are formed at opposite points with projections 13 which fit into recessed projections 14 formed on the auxiliary rim A and upon opposite sides of the member P. The contour of the projections 13 and the recessed projections 14 are such that one restricts the movement of the other, and when the securing members 12 are in position, the projections 13 are positively secured within the recesses, as clearly shown in Fig. 4.

To secure the attaching frame K to the wheel W, and at the same time permit it to move diametrically of the wheel W so that the pneumatic tire may perform its cushioning function in the normal way, I provide a plurality of yokes Y mounted upon the felly F at points corresponding to the tread members P. Each yoke Y is of substantial U-shaped formation, and as shown in Fig. 3, the side portions thereof extend radially upon opposite sides of the felly and the pneumatic tire T. The intermediate portion of the yoke Y is formed with a radially extending spindle 15 which is mounted for reciprocating movement within a socket B secured to the inner surface of the felly F by means of a bolt 16. The socket B is provided with roller bearings 17, between which the spindle 15 is adapted to move, and such bearings are confined within the socket by means of a cover plate 18. The lower wall of the socket B is formed with a depressed portion 19 at a point directly below the spindle 15, and this depressed portion is filled with rubber or of a cushioning material so as to form a resilient buffer for the spindle.

With a yoke mounted in the manner just described, it is capable of outward or inward radial movement with the least amount of friction. The opposite ends of each yoke Y are enlarged and flanged, as shown in Fig. 2, to provide sockets S of substantially ovate contour to receive heads H of corresponding shape which are formed at corresponding points upon the annuli L and L'. The heads H are formed on the inner ends of extensions 20 of the annuli L or L', and such extensions are provided with laterally extending ribs 21 for the purpose of reinforcement. When the heads H are mounted within the sockets S of the yoke Y, as shown in Figs. 2 and 3, because of the contour of these members, sliding movement circumferentially of these members, with respect to the wheel is prevented, but as an additional preventive and securing means, I provide pins 21 formed on the heads H which extend into openings 22 formed in the yoke Y, such pins and openings being of rectangular formation, as shown in Figs. 2 and 5. To prevent lateral movement of the heads within the sockets, I provide a securing member 23 which extends through openings formed in the heads and yokes and which may be readily withdrawn to permit a removal of the attaching frame K.

In operation, the movable yokes Y permit the wheel W to move diametrically of the entire device so that the pneumatic tire T will be unrestricted to perform its cushioning function. Under actual working conditions, the pneumatic tire is forced downwardly upon the tread members P, and in so doing is compressed in one direction and correspondingly expanded in the other. During this action of the pneumatic tire, the sockets B move radially, while the yokes Y remain stationary so that the entire wheel moves independently of the auxiliary tire T' and thus allows the pneumatic tire to absorb the shocks in its usual efficient manner.

Although the device is free to move diametrically of the wheel, circumferential movement of the same with relation to the wheel is positively prevented by virtue of the head and socket connection between the yokes Y and the attaching frame K. The spindles 15 have sufficient circumferential play to permit the tread vibrations and the cushioning action of the tire resulting from the slight compression of the tire at the center of the tread at intervals, by the convex or dome-shaped protuberances. Such an arrangement prevents wear between the contacting surface of the pneumatic tire and the tread members, while at the same time it allows the proper functioning of the pneumatic tire. The annular series of spaced convex or dome shaped protuberances K maintain the pneumatic tire in spaced relation with the body of the annular protective covering and when a wheel encounters an inequality of a road the dome shaped protuberances at the bottom portion of the wheel will indent slightly the tread of the pneumatic tire around a considerable portion of the same so that instead of having a localized compression of the tire at the bottom of the wheel, the compression will be distributed over a relatively large surface of the tread of the tire by means of a plurality of indentations produced by the dome shaped protuberances and as a result of this action only very little relative inward movement of the protective covering is required in the cushioning action of the pneumatic tire and only a small amount of play is necessary at the yokes to permit such action. It has been found in practice with a full sized automobile wheel that the amount of inward movement of the protuberances in indenting the pneumatic tire is approximately $\frac{3}{16}$ of an inch and the yokes will be of sufficient width to allow such play.

It will be noted that movement of the attaching frame with relation to the auxiliary rim is also prevented by virtue of the securing means 12 and the interfitting projections 13 and 14, thus all of the parts of the device are rigidly secured against circumferential creeping, while at the same time they are free to move radially of the wheel so that they do not interfere with the action of the pneumatic tire.

It is to be noted that the lower ends of the yokes Y terminate at such points so as to permit the demounting of the rim R after the attaching frame K has been removed. It is obvious that by removing the securing members 23, and pulling the attaching frame laterally in one direction or the other, the entire attaching frame, rim, and solid tire may be removed from the wheel, thus permitting ready removal of the pneumatic tire without necessitating the detaching of the yokes Y.

Although I have herein shown and described only one form of device embodying my invention, it is to be understood that various changes and modifications may be made herein without departing from the spirit of the invention, and the spirit and scope of the appended claims.

What I claim is:

1. In combination, a felly, a pneumatic tire, an auxiliary tire surrounding the latter, an auxiliary rim for supporting the auxiliary tire, an attaching frame for the auxiliary rim comprising a pair of annuli, yokes arranged at intervals about the felly and mounted for radial movement, and a head and socket connection between said yokes and annuli at each end of the yokes.

2. In combination, a felly, a pneumatic tire, an auxiliary tire surrounding the latter, an auxiliary rim for supporting the auxiliary tire and provided with protuberances fitting against the pneumatic tire, said auxiliary rim being also provided at opposite sides with recesses, a pair of annuli having projections fitting in the said recesses to interlock the annuli with the auxiliary rim, transverse fastening devices piercing the projections and extending through the protuberances for detachably securing the annuli in their interlocked relation with the auxiliary rim and means for connecting the annuli with the felly, said connecting means having radially movable parts.

3. In combination, a felly, a pneumatic tire, an auxiliary tire surrounding the latter, an auxiliary rim for supporting the auxiliary tire provided with approximately semi-spherical protuberances fitting against the tread of the tire at intervals, annular flanges extending inwardly from opposite sides of the auxiliary rim, transverse fastening devices piercing the flanges and the protuberances and means for connecting the flanges with the felly, said connecting means having radially movable parts.

4. In combination, a felly, a pneumatic tire thereon, an auxiliary tire surrounding the latter, an auxiliary rim for supporting the auxiliary tire, an attaching frame for the auxiliary rim, yokes mounted on said felly, spindles carried by said yokes, sockets on said felly for slidingly receiving said spindles, and a head and socket connection between said frame and yokes at each end of the latter.

In testimony whereof I have signed my name to this specification.

CHARLES FREDERICK FOX ALLAN.